United States Patent [19]
Hammer et al.

[11] Patent Number: 6,033,698
[45] Date of Patent: Mar. 7, 2000

[54] FIBER-REINFORCED CELLULOSE-HYDRATE-BASED FOOD CASING PRODUCED WITH A DECREASED AMOUNT OF VISCOSE

[75] Inventors: Klaus-Dieter Hammer, Mainz; Herbert Gord, Ingelheim; Gerhard Grolig, Moerfelden-Walldorf; Manfred Siebrecht, Wiesbaden, all of Germany

[73] Assignee: Hoechst Aktiengesellschaft, Frankfurt, Germany

[21] Appl. No.: 08/620,955

[22] Filed: Mar. 25, 1996

[30] Foreign Application Priority Data

Mar. 24, 1995 [DE] Germany .................... 195 10 883

[51] Int. Cl.⁷ .................................................. A22C 13/00
[52] U.S. Cl. ........................ 426/105; 138/118.1; 264/557; 426/129; 428/34.8
[58] Field of Search ..................... 426/105, 129, 426/135, 2, 76, 138; 264/187, 188, 558, 561, 563, 557; 428/34.8; 138/118.1

[56] References Cited

U.S. PATENT DOCUMENTS

| | | |
|---|---|---|
| 2,901,358 | 8/1959 | Underwood et al. . |
| 3,135,613 | 6/1964 | Underwood . |
| 3,833,022 | 9/1974 | Turbak et al. ..................... 426/105 |
| 4,164,536 | 8/1979 | Bentley ............................ 264/188 |
| 4,195,054 | 3/1980 | Verellen et al. .................. 264/558 |
| 4,317,794 | 3/1982 | Gord et al. ....................... 264/561 |
| 4,401,136 | 8/1983 | Porrmann et al. ............... 138/118.1 |
| 4,623,566 | 11/1986 | Kastl et al. ...................... 426/105 |
| 4,814,034 | 3/1989 | Hansen et al. ................... 264/188 |

FOREIGN PATENT DOCUMENTS

| | | |
|---|---|---|
| 0 460 348 | 12/1991 | European Pat. Off. . |
| 1 965 129 | 7/1971 | Germany . |
| 1 965 130 | 7/1971 | Germany . |
| 1 330 698 | 9/1973 | United Kingdom . |
| 1 336 850 | 11/1973 | United Kingdom . |
| WO 82/02649 | 8/1982 | WIPO . |
| 91/09530 | 7/1991 | WIPO . |

*Primary Examiner*—Joseph W. Drodge
*Attorney, Agent, or Firm*—Foley & Lardner

[57] ABSTRACT

A fiber-reinforced, tubular food casing based on regenerated cellulose, which is produced using an amount of viscose solution which is decreased by 10 to 30% in comparison with the standard casing at a spinning speed increased by at least 25%.

13 Claims, No Drawings

FIBER-REINFORCED CELLULOSE-HYDRATE-BASED FOOD CASING PRODUCED WITH A DECREASED AMOUNT OF VISCOSE

BACKGROUND OF THE INVENTION

The present invention relates to a fiber-reinforced, tubular food casing based on regenerated cellulose. This casing is preferably used as a sausage casing.

Fiber-reinforced cellulose-hydrate-based food casings have been on the market since as early as 1933 in the U.S.A. and since 1936 in Germany and have been successively improved since then. They are generally produced by the viscose process, in which a cellulose xanthogenate solution, termed a "viscose solution", is applied to a usually tubular nonwoven fiber web. If this viscose solution is only applied to the outside, one speaks of an "outer-viscosing" (DE-A 19 65 129), while coating the outside and inside is termed "double-viscosing" (DE-A 19 65 130). The viscose-coated fibrous material is then conducted through spinning and precipitation baths, each of which contain sulfuric acid, ammonium sulfate and sodium sulfate at various concentrations. The viscose is first coagulated, and cellulose hydrate is then regenerated via xanthogenic acid. The cellulose hydrate tube produced in this way is then conducted through a plurality of washing baths. The spinning speed (and correspondingly the speed at which the casing is drawn through the baths) is about 20 to 28 m/min, depending on the sausage skin spinning machine used. The cellulose hydrate casings are conventionally further treated with a secondary softener, such as glycerol, and dried.

The nonwoven fiber web (fiber paper) generally comprises hemp fibers. Fiber papers having a weight of 13 g, 15 g, 17 g, 19 g, 21 g, 23.7 g and 25.4 g per square meter are conventionally used. The contents of the regenerated cellulose and of the softener remain relatively constant. Thus the cellulose hydrate content is generally 40 to 55 g/m$^2$, and the glycerol content is generally 15 to 30 g/m$^2$. The food casings additionally contain about 8 to 10% by weight of water, based on their total weight, which—depending on the diameter—is about 75 to 105 g/m$^2$. They are opaque, so that their contents cannot be discerned, and they are additionally stiff, which hinders fabrication and processing.

One potential method for solving these problems is to use lighter fiber paper. Thus, WO 91/09530 (=EP-B 0 460 410) discloses a tubular cellulose-hydrate-based food casing which is reinforced by a long-fibered manilla fiber paper having a weight of no more than 15 g/m$^2$ (in the air-dried state).

The use of thinner paper with a constant amount of viscose is relatively cost-intensive. A reduction in the viscose solution with a constant fiber-paper weight to improve the transparency, however, leads to greatly decreased strength.

SUMMARY OF THE INVENTION

One object of the present invention is therefore to provide an improved fiber-reinforced cellulose hydrate food casing.

A particular object of the invention is to provide a fiber-reinforced, transparent, cellulose-hydrate-based food casing which is more pliable than the known casings and additionally is cheaper to produce.

Another object of the invention resides in the provision of an improved process for the production of fiber-reinforced, tubular food casings based on regenerated cellulose.

It is also an object of the invention to provide an improved sausage product based on the improved fiber-reinforced tubular food casings according to the invention.

In accomplishing the foregoing objects, there has been provided in accordance with one aspect of the present invention a fiber-reinforced, tubular food casing based on regenerated cellulose, comprising a nonwoven fiber web impregnated with regenerated cellulose which is present in a reduced amount as a result of production of the food casing using an amount of viscose solution which is decreased by 10 to 30% in comparison with the standard amount used to produce fiber-reinforced, tubular food casings based on regenerated cellulose, at a spinning speed increased by at least 25% in comparison to the standard process.

In accordance with another aspect of the invention, there has been provided a fiber-reinforced, tubular food casing based on regenerated cellulose, comprising a nonwoven fiber web impregnated with regenerated cellulose which is present in an amount that is reduced in comparison to conventional fiber-reinforced, tubular food casings based on regenerated cellulose, by an amount that is sufficient to produce an increase in internal bursting pressure for the food casing of at least 5%.

According to another aspect of the invention, there has been provided a process for the production of fiber-reinforced, tubular food casing based on regenerated cellulose, comprising the steps of impregnating a nonwoven fiber web with a viscose solution, wherein the amount of viscose solution is decreased by 10 to 30% in comparison with the standard amount used to produce fiber-reinforced, tubular food casings based on regenerated cellulose, and regenerating the viscose in a standard acid bath at a spinning speed increased by at least 25% in comparison to the normal speed for processing regenerated cellulose food casings. The invention provides products made by this process, as well.

Finally, the invention provides, according to another aspect, a sausage product, comprising a sausage filling composition surrounded by a food casing as defined above.

Further objects, features and advantages of the present invention will become apparent to those of ordinary skill in the art upon consideration of the detailed description of preferred embodiments that follows.

DETAILED DESCRIPTION OF THE PREFERRED EMBODIMENTS

The invention provides a fiber-reinforced, tubular food casing based on regenerated cellulose, which is produced using an amount of viscose solution which is decreased by 10 to 30% in comparison with the standard, at a spinning speed increased by at least 25%. The amount of viscose is preferably reduced by 15 to 25%. The spinning speed is preferably increased by 25 to 60%. Absolute values of the spinning speed may only be given with difficulty, since the optimum speed varies with the type of spinning machine.

At the elevated spinning speed, no change in the composition of the spinning and precipitation baths is necessary. In contrast, at "standard speed" and with a simultaneously decreased amount of viscose solution, a fundamental change in the composition of the spinning and precipitation baths is necessary.

With a decreasing amount of viscose applied, a greater or lesser decrease in the mechanical strength of the food casings was actually to be expected. Surprisingly, however, precisely the opposite was found. Thus, the food casings of the invention withstood a 5 to 20% higher internal pressure before they burst than those produced with the "usual"

amount of viscose solution (with an identical fiber-paper weight in each case). An electron microscopic study, showed that in the case of the food casings of the invention, the proportion of "dense" cellulose hydrate zones had increased. These dense zones on the inside and outside primarily determine the mechanical strength of the casing. The increase is related to the decrease in the "loose" cellulose hydrate zone in the interior of the casing.

Thus, in the casings according to the present invention, the ratio between the "dense" zones on the inside and the outside, and the "loose" (=non compact) interior zone is about 20:65 to about 20:75. In the casings hitherto known, this ratio has been about 20:76 to 20:80.

The food casings of the invention are preferably produced using a fiber paper having a weight of at least 17 g/m$^2$, particularly preferably 17 to 25.4 g/m$^2$. The fiber paper preferably comprises hemp fibers. The casings are outer- or double-viscosed.

The food casings of the invention can contain additional polymeric compounds which do not form gas in the regeneration. These are preferably cellulose-like compounds (EP-A 0 460 348). Such compounds which are miscible with viscose solution are, e.g., alginates or high-molecular-weight copolymers which predominantly contain vinyl pyrrolidone units (®Gafquat 755N). These polymers not only control the regeneration, but also further serve as primary (remaining in the casing on soaking) softeners, so that a secondary (removable from the casing by soaking) softener, such as glycerol, can be dispensed with. The content of additional polymeric compound is about 5 to 20% by weight, based on the weight of the dry cellulose.

The food casings of the invention can optionally and additionally be given a conventional internal impregnation, e.g., of casein/glyoxal.

In comparison with the standard casings, the weight of the food casings of the invention containing glycerol is about 10 to 15% lower and without glycerol is about 15 to 25% lower.

Owing to the decreased wall thickness, particularly long casing sections may be gathered to form "sticks" or shirred casing sections, so that still more expedient processing is possible. The casings of the invention may be filled in the soaked or unsoaked state.

The food casings of the invention are used particularly as sausage casings, especially for rapidly-ripened long-keeping sausage types (e.g. "Bergsteigerwurst" or "Rauchbunkerl", an Austrian speciality) and for smoked scalded-emulsion sausage types. Owing to the decreased wall thickness, the casing of the invention shows higher permeation (water permeability under pressure). In the case of standard casings, the permeation at an internal pressure of 40 bar is about 90 to 110 l of water per square meter per day, and those of the invention, in contrast, are 20 to 40% greater.

In the production of long-keeping sausage, drying after filling proceeds particularly rapidly. In the case of rapidly ripened long-keeping sausage types, an addition of gluconodeltalactone (GDL) effects a more rapid coagulation, which demands more rapid release of water. Transparency is good, so that the sausage emulsion surface is clearly visible.

Finally, the thinner fiber casings are particularly rapidly biodegradable and thus highly compostible.

The following examples describe the invention. The data of the standard casings and of the casings according to the invention are compared in Tables 1 to 3.

EXAMPLE 1

A 17 g hemp fiber paper was formed into a tube having a diameter of 68 mm (=caliber 68) and was outer-viscosed. The amount of viscose solution was below that conventionally used by 15% by weight. The tubular casing thus coated was conducted at a speed 30% above the standard speed through the conventional spinning, precipitation, washing and softener vats. Before drying, the tube was then further impregnated from the inside with an aqueous solution which contained casein and glyoxal. The casing dried in the inflated state was then gathered (shirred). Each stick comprised 50 m of the casing. During filling on a filling and clipping automat (type FCA from Niedecker GmbH, Frankfurt/M.), there were no breakdowns. The filling caliber varied between 73.5 and 75 mm. On ripening, the sausages were dried off after a 10 to 15% shorter time. Their appearance was very good. The peelability after a storage time of 2 weeks was rated as "2" (=normal; subjective rating scale from 1="very easy" to 6="unsatisfactory").

TABLE 1

| Characteristics | Comparison caliber 68 FDI* standard | Invention caliber 68 FDI light | Difference in % |
|---|---|---|---|
| Weight, g/m$^2$ | 84 | 74.0 | −12.0 |
| Glycerol, % by weight | 23 | 22.3 | −3.1 |
| Bursting pressure, kPa | 71 | 78 | +10.0 |
| Test caliber in mm at 21 kPa | 71.9–74.9 ø 73.4 | 73.8 | +0.5 |
| Water imbibition, % | 130 | 137.2 | +5.5 |
| Permeation, l/m$^2$ · d at 40 bar | 100 | 115 | +15.0 |

*FDI = internally impregnated fiber-reinforced casing

EXAMPLE 2

A 17 g hemp fiber paper was formed into a tube of caliber 48 and coated on the outside with viscose. The viscose solution used for this contained 10% by weight of a 4% strength aqueous sodium alginate solution. The content of alginate in the finished casing was about 5% by weight, based on the weight of the (dry) cellulose. For coating, an amount of viscose solution decreased by 15% by weight in comparison with the standard was used. The tube was drawn through the conventional baths (see Example 1) at a speed 47% higher than the standard, then internally impregnated, dried in the inflated state, then pressed flat and wound up. Pieces each of 50 m in length were shirred to form a stick. On filling on same filling and clipping automat used in Example 1, there were no breakdowns. The filling caliber was 48 to 49.5 mm. The course of ripening was normal. The appearance of the sausages was very good. The peelability was rated "2".

TABLE 2

| Characteristics | Comparison caliber 48 FDI standard | Invention caliber 48 FDI light | Difference in % |
|---|---|---|---|
| Weight, g/m$^2$ | 84 | 70 | −16.6 |
| Glycerol, % by weight | 23 | 22.3 | −3.1 |
| Bursting pressure, kPa | 89 | 102.4 | +15.0 |
| Test caliber in mm at 21 kPa | 52.4–54.4 ø 53.4 | 53.4 | ±0 |
| Water imbibition, % | 130 | 151 | +16.0 |

TABLE 2-continued

| Characteristics | Comparison caliber 48 FDI standard | Invention caliber 48 FDI light | Difference in % |
|---|---|---|---|
| Permeation, l/m$^2$ · d at 40 bar | 100 | 113 | +13.0 |

EXAMPLE 3

A 19 g hemp fiber paper was formed into a tube of caliber 70 and coated from the outside with a mixture of 197.0 l of viscose solution,
14.7 l of 4% strength aqueous sodium alginate solution,
1.65 l of 50% strength by weight aqueous calcium stearate dispersion and
2.7 l of 10% strength by weight aqueous N-vinylpyrrolidone copolymer solution (®Gafquat 755N)

The finished casing contained, based on the weight of the dry cellulose, 5% by weight of alginate, 6% by weight of calcium stearate and 2% by weight of the N-vinylpyrrolidone copolymer. An amount of coating solution 20% by weight less than the standard was used for coating. The coated tube was drawn through the conventional baths at a speed 55% higher than the standard. Sections each of 70 m in length were shirred to form a stick. The behavior on filling on the same filling and clipping automat as used in the previous Examples was normal. Breakdowns were not observed. The course of ripening and peelability were good.

TABLE 3

| Characteristics | Comparison caliber 70 FDI standard | Invention caliber 70 FDI light | Difference in % |
|---|---|---|---|
| Weight, g/m$^2$ | 84 | 68 | −20.0 |
| Glycerol, % by weight | 22 | 0 | |
| Bursting pressure, kPa | 68 | 76.2 | +12.0 |
| Test caliber in mm at 21 kPa | 74.6–77.6 ⌀ 76.1 | 76.4 | +0.4 |
| Water imbibition, % | 130 | 120 | −7.7 |
| Permeation, l/m$^2$ · d at 40 bar | 100 | 83 | −17.0 |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A fiber-reinforced, tubular food casing based on regenerated cellulose, comprising a nonwoven fiber web impregnated with regenerated cellulose, wherein the casing has a ratio of dense cellulose hydrate zones on the inside and outside of the casing to loose zones on the inside of the casing of about 20:65 to about 20:75 as result of production of the food casing using a selected amount of viscose solution which is regenerated by spinning at a selected spinning speed.

2. A food casing as claimed in claim 1, wherein it is produced using a fiber paper having a weight of at least 17 g/m$^2$.

3. A food casing as claimed in claim 2, wherein it is produced using a fiber having a weight of 17 to 25.4 g/m$^2$.

4. A food casing as claimed in claim 2, wherein the fiber paper comprises hemp fibers.

5. A food casing as claimed in claim 1, wherein it is outer- or double-viscosed.

6. A food casing as claimed in claim 1, wherein it contains additional polymeric compounds which do not form gas in the regeneration.

7. A food casing as claimed in claim 6, wherein the content of additional polymeric compounds about 5 to 20% by weight, based on the weight of the dry cellulose.

8. A food casing as claimed in claim 1, wherein it contains glycerol as a softener.

9. A food casing as claimed in claim 8, wherein the weight of the glycerol-containing food casings is lower than that of the glycerol-free casings by about 15 to 25%.

10. A food casing as claimed in claim 1, wherein it further comprises an impregnation on its internal surface.

11. A food casing as claimed in claim 1, produced by a process comprising the steps of impregnating a nonwoven fiber web with the viscose solution and regenerating the viscose solution in a standard acid bath.

12. A sausage product, comprising a sausage filling composition surrounded by a food casing as claimed in claim 1.

13. A food casing as claimed in claim 1, which consists essentially of said nonwoven fiber web impregnated with said regenerated cellulose.

* * * * *

UNITED STATES PATENT AND TRADEMARK OFFICE
CERTIFICATE OF CORRECTION

PATENT NO. : 6,033,698
DATED : March 7, 2000
INVENTOR(S) : Klaus-Dieter HAMMER, et al.

It is certified that error appears in the above-identified patent and that said Letters Patent is hereby corrected as shown below:

Claim 1, line 14, insert after as --a--.

Claim 7, line 2, insert after compounds --is--.

Claim 8, line 2, insert after a --secondary--.

Signed and Sealed this

Twenty-fourth Day of April, 2001

Attest:

NICHOLAS P. GODICI

Attesting Officer        Acting Director of the United States Patent and Trademark Office